(12) United States Patent
Lamberti et al.

(10) Patent No.: US 11,923,139 B2
(45) Date of Patent: Mar. 5, 2024

(54) ENERGY STORAGE DEVICE FOR HIGH TEMPERATURE APPLICATIONS

(71) Applicant: ENI S.P.A., Rome (IT)

(72) Inventors: Andrea Lamberti, Bra (IT); Massimo Zampato, Venice (IT); Stefano Carminati, San Donato Milanese (IT); Mara Serrapede, Pecetto Torinese (IT); Arnaud Nicholas Gigot, Turin (IT)

(73) Assignee: ENI S.P.A., Rome (IT)

( * ) Notice: Subject to any disclaimer, the term of this patent is extended or adjusted under 35 U.S.C. 154(b) by 0 days.

(21) Appl. No.: 17/048,157

(22) PCT Filed: Apr. 16, 2019

(86) PCT No.: PCT/EP2019/059738
§ 371 (c)(1),
(2) Date: Oct. 16, 2020

(87) PCT Pub. No.: WO2019/201887
PCT Pub. Date: Oct. 24, 2019

(65) Prior Publication Data
US 2021/0375558 A1 Dec. 2, 2021

(30) Foreign Application Priority Data
Apr. 17, 2018 (IT) .................. 102018000004596

(51) Int. Cl.
*H01G 11/28* (2013.01)
*H01G 11/24* (2013.01)
(Continued)

(52) U.S. Cl.
CPC ............ *H01G 11/28* (2013.01); *H01G 11/24* (2013.01); *H01G 11/36* (2013.01); *H01G 11/46* (2013.01);
(Continued)

(58) Field of Classification Search
CPC ........ H01G 11/38; H01G 11/70; H01G 11/24; H01G 11/36; H01G 11/60; H01G 11/28; H01G 11/46
See application file for complete search history.

(56) References Cited

U.S. PATENT DOCUMENTS 5,744,258 A * 4/1998 Bai ..................... H01M 4/0402
429/3
8,760,851 B2 6/2014 Signorelli et al.
(Continued)

FOREIGN PATENT DOCUMENTS

CN 104658764 A * 5/2015
CN 107017430 A 8/2017
(Continued)

OTHER PUBLICATIONS

Huang et al.; Synthesis of molybdenum disulfide/carbon aerogel composites for supercapacitors electrode material application, Electrochimica Acta; vol. 109, Oct. 30, 2013, pp. 587-594 (Year: 2013).*

(Continued)

*Primary Examiner* — David M Sinclair
(74) *Attorney, Agent, or Firm* — Ruggiero McAllister & McMahon LLC (57) ABSTRACT

An energy storage device, especially a super capacitor, useful for high temperature applications has current collector elements supporting a carbonaceous matrix modified or doped with pseudo-capacitive materials, including one or more transition metal dichalcogenides, transition metal oxides and mixtures thereof, in contact with a non-aqueous electrolyte composition whereby it is possible to exploit the faradic mechanism in addition to the electric double layer mechanism as an energy storage principle.

31 Claims, 3 Drawing Sheets

Process flow for the fabrication of the wound supercapacitor (51) Int. Cl.
*H01G 11/36* (2013.01)
*H01G 11/46* (2013.01)
*H01G 11/60* (2013.01)
*H01G 11/38* (2013.01)
*H01G 11/70* (2013.01)

(52) U.S. Cl.
CPC .............. *H01G 11/60* (2013.01); *H01G 11/38* (2013.01); *H01G 11/70* (2013.01)

(56) References Cited

U.S. PATENT DOCUMENTS

| | | | |
|---|---|---|---|
| 10,535,899 | B2 | 1/2020 | Narita et al. |
| 11,264,648 | B2 | 3/2022 | Narita et al. |
| 2012/0156528 | A1 | 6/2012 | Cooley |
| 2013/0021718 | A1* | 1/2013 | Yager ............... H01G 11/36 361/502 |
| 2013/0342962 | A1 | 12/2013 | Fletcher et al. |
| 2014/0042988 | A1* | 2/2014 | Kuttipillai ........... H01M 10/052 320/167 |
| 2014/0057164 | A1 | 2/2014 | Brambilla et al. |
| 2014/0178759 | A1* | 6/2014 | Worsley ............ H01M 10/0525 429/220 |
| 2016/0284481 | A1* | 9/2016 | Duan .................. H01G 11/36 |
| 2017/0062143 | A1 | 3/2017 | Zhamu et al. |
| 2017/0084401 | A1 | 3/2017 | Weibing |
| 2017/0250383 | A1* | 8/2017 | Goto .................. H01M 50/10 |
| 2017/0338059 | A1* | 11/2017 | Knopsnyder .......... H01G 11/18 |
| 2018/0068803 | A1 | 3/2018 | Brombilla et al. |

FOREIGN PATENT DOCUMENTS

JP 2015502033 A * 1/2015
WO 2013067540 A1 5/2013

OTHER PUBLICATIONS

Yang et al.; High-performance supercapacitor based on three-dimensional MoS2/graphene aerogel composites, Composites Science and Technology, vol. 121, Dec. 16, 2015, pp. 123-128 (Year: 2015).*
Gigot et al; "Mixed 1T-2H Phase $MoS_2$/Reduced Graphene Oxide as Active Electrode for Enhanced Supercapacitive Performance"; ACS Appl. Interfaces 2016; pp. 32842-32853.
International Search report dated Jun. 21, 2019 for PCT application No. PCT/EP2019/059738.
Written Opinion report dated Jun. 21, 2019 for PCT application No. PCT/EP2019/059738.
Chinese Office Action dated Oct. 9, 2021 for Chinese Appl. No. 201980026716.X.
https://webbook.nist.gov/cgi/cbook.cgi?ID=C75058&Mark=4; NIST Chemistry WebBook, SRD 69; 1pg.
https://webbook.nist.gov/cgi/cbook.cgi?ID=C109999&Mark=4; NIST Chemistry WebBook, SRD 69; 1pg.
Eurasian Office Action dated Feb. 16, 2023 from corresponding Eurasian Patent Application No. 202092496, 8 pages.
"Hummers method" (William S. Hummers Jr., Richard E. Offeman, J. Am. Chem. Soc., 1958, 80 (6), pp. 1339-1339, DOI: 10.1021/ja01539a017, Publication Date: Mar. 1958).

* cited by examiner

Figure 1. Cyclic voltammetries recorded between 30 °C and 200 °C at 30 mV/s of scan rate for a device containing the materials rGO/MoS$_2$.

Figure 2. TGA and DSC curves of rGO/MoS$_2$.

Figure 3. Process flow for the fabrication of the wound supercapacitor

ENERGY STORAGE DEVICE FOR HIGH TEMPERATURE APPLICATIONS

CROSS REFERENCE TO RELATED APPLICATION

This application claims the benefit under 35 U.S.C. § 119(a) of Italian Application No. 102018000004596 filed on Apr. 17, 2018, and is a national stage application under 35 U.S.C. § 371, of PCT/EP2019/059738 filed on Apr. 16, 2019, the contents of both are incorporated by reference herein in their entirety.

BACKGROUND OF THE DISCLOSURE

1. Field of the Disclosure

This disclosure relates to a device for use in equipment which requires electrical energy, and in particular the disclosed device may be useful as an energy storage device for use in extreme environmental conditions. An electrolyte composition useful in such a device is also disclosed.

2. Description of the Related Art

The need for compact energy storage is evident in many fields of technology. Since many pieces of equipment are now required to be capable of operation independently of a power grid, considerable efforts have been made in research into electrical charge storage devices.

Devices such as "coin" or "button" sized cells have a limited energy value, and a relatively short duration of useful life. Larger units, so-called "batteries" of cells capable of greater electrical energy output or extended operational life are available, but may only be used in conditions which do not lead to breakdown of component materials such as liquid electrolytes required for functioning of the cell or battery.

Another form of stored charge device is the capacitor which holds an electrical static charge which can be selectively rapidly discharged to do limited work, for example to activate a door lock or trigger an alarm system.

Whereas both cells and capacitors have electrodes of opposite polarity to connect with an external circuit, internally they operate on different principles. A cell typically employs a chemical reaction between the electrodes and electrolytes within the cell which releases electrical energy as the chemical reaction proceeds. When the chemical reaction runs close to completion, the cell is no longer able to provide sufficient electrical energy and is regarded as depleted.

In contrast a capacitor has an internal non-conductor or dielectric material between spaced conductive plates and a high static electrical charge can be built up across the dielectric material.

Therefore, in comparison of these two types of devices it can said that cells at present levels of technology tend to be slow to charge, are capable of holding the electrical charge for a limited shelf-life period and may deliver a predictable level of electrical energy over an anticipated timescale. In contrast, capacitors can be repeatedly quickly charged and upon a discharge opportunity may deliver an intense burst of energy in an instantaneous period of time. Thus these types of electrical energy storage device have tended to follow divergent development paths, but hybrid devices have been considered for certain purposes.

An aim of the subject matter of this disclosure is to provide an electrical energy storage device providing useful operating properties and favourable characteristics over a wide range of operational conditions, including normal temperatures and pressures, for example at room temperature.

Another aim of the subject matter of this disclosure is to provide an electrical energy storage device which may be useful in equipment or devices which may be exposed to extreme conditions of temperature and pressure, such as may be encountered in a subterranean environment.

A further aim of the subject matter of this disclosure is to provide an electrolyte composition which would be useful in an electrical energy storage device.

It has been recognised in this field that typical electrochemical energy storage devices are limited by thermally induced degradation of electrolytes and separator when exposed to temperatures exceeding 100° C. Several commercially available devices contain liquid electrolytes (usually organic solvents with low boiling point). Therefore, presently, the commercially warranted maximum temperature for such devices is set at 85° C. Currently, a temperature range of between 50° C. and 100° C. is considered in the field as a "high temperature" exposure.

It would be desirable to obtain an electrochemical energy storage device that could also be operated in conditions in excess of the current "high temperature" profile, for example desirably even up to 200° C. or higher.

The present disclosure is concerned with a development of the capacitor type of device, often referred to as a "supercapacitor" or an "ultracapacitor" in this field. Supercapacitors are known per se. The supercapacitor differs from the basic capacitor in that whereas the capacitor has conductive metal plates spaced apart by an insulator, the supercapacitor additionally has modifications to the conductive metal plates, and these plates are immersed in an electrolyte to serve as electrodes. Also, an electrical charge double layer develops in the boundary between electrode and electrolyte. Each conductive metal plate in the supercapacitor is coated with a porous material which has a greater surface area than the plate itself, for example activated carbon which increases the amount of electric charge (capacitance) which can be stored in the supercapacitor for a given applied voltage.

The following documents may provide information which may assist in understanding the background to the present disclosure:

(1) U.S. Pat. No. 8,760,851 B2; (2) US 2012/0156528 A1; (3) US 2013/0342962 A1; (4) WO 2013/067540 A1; (5) US 2014/057164 A1; (6) CN 2013/10570159; (7) CN 2015/10821905.

SUMMARY OF INVENTION

In this disclosure, an energy storage device especially useful for high temperature application comprising current collector elements supporting a carbonaceous matrix modified or doped with pseudo-capacitive materials in contact with a non-aqueous electrolyte composition is described, whereby the possibility to exploit the faradic mechanism in addition to the electric double layer mechanism as an energy storage principle is proposed. The carbonaceous matrix may be modified or doped with one or more transition metal ($M^t$) compounds selected from chalcogenides, oxides and mixtures thereof. The device may comprise transition metal dichalcogenides, and optionally, also include transition metal oxides. The modified or doped carbonaceous matrix serves as the active material enabling key functional requirements to be met with regard to the intended use. The active material may include the materials described below.

The transition metals ($M^t$) may be selected from Groups 3-12 of the Periodic Table, and in embodiments, for example, may be one or more transition metals selected from aluminium (Al), titanium (Ti), vanadium (V), chromium (Cr), manganese (Mn), iron (Fe), cobalt (Co), nickel (Ni), copper (Cu), zinc (Zn), molybdenum (Mo), palladium (Pa), silver (Ag), cadmium (Cd), tungsten (W), preferably selected on the basis of exhibiting semiconducting properties when in oxide [$M^tO_x$], (wherein x corresponds to the available valency of the metal M), or chalcogenide forms [$M^tX^c_2$.]

The chalcogens ($X^c$), for example, may be selected from sulphur (S), selenium (Se), or tellurium (Te), sulphur being conveniently available in greatest abundance.

The dichalcogenides [$M^tX^c_2$], for example, may be selected from $MoS_2$, $MoSe_2$, $WS_2$, $WSe_2$, $TeS_2$, $TeSe_2$, alone or in various combinations thereof. The following also are possible component materials for present purposes: $TiS_2$, $TaS_2$, $ZrS_2$, $Bi_2S_3$, $Bi_2Se_3$, $Bi_2Te_3$, $MoSe_2$, $TaSe_2$, $NbSe_2$, $MoTe_2$, $NiTe_2$, $BiTe_2$, $GeS_2$, $GeSe_2$, $GeTe$, $ZnS$, $ZnSe$, $EuSe$, $Ag_2S$, $Ag_2Se$, $Ag_2Te$, $FeS_2$, $Fe_7S_8$, $Fe_3S_4$, $FeSe_2$, $Fe_3Se_4$, $\beta$-$FeSe_x$, $In_2S_3$, $SnS$, $SnS_2$, $SnSe$, $SnTe$, $CuS$, $Cu_2S$, $Cu_2$-$xSe$, $Sb_2S_3$, $Sb_2Te_3$, $MnS$, $MnSe$, $CoS_2$, $CoS_3$, $CoTe$, $NiS$, $NiSe$, $NiTe$, $VS_2$, alone or in various combinations.

The current collector elements may comprise metallic components, optionally supported upon other materials such as plastics, glasses or ceramics, and connectable by electrical conductor elements to other components to form part of an electrical circuit for charging or discharging purposes, wherein the electrical circuit may include an electrical power source or generator. The current collector elements may be referred to as composite positive- and composite negative-electrodes. The metallic component may be configured in a variety of physical forms, optionally in a flexible form, such as a mesh, a foil, a foam, a sponge, a sheet, a scroll, a plate, a coil, rods, etc. to which a modified or doped carbonaceous matrix composition has been applied, for example as a conductive adherent layer or contiguous coating.

The current collector may be prepared for enhanced active material coating or loading by treatments such as by surface modifications for example to increase surface roughness, or by exploiting a dendritic copper foil electrodeposited upon a current collector substrate. Such a prepared current collector more readily accepts a slurry of coating materials and demonstrates improved adhesion of the intended coating.

A carbon-coated metallic current collector may display improved performance in a device, since there can be a reduction in interaction between the electrolyte and the current collector surface without adversely affecting electrical conduction across that interface.

In constructing a device, improved performance may be achieved by exploiting an asymmetric construction wherein, for example, where a first electrode is formed using an electric double layer material (EDL), and a second electrode comprises a pseudo-capacitance material (PC), for example as an EDL/PC mixture. Such an asymmetric device assembled with two different electrode materials can offer a wide operational voltage window with consequential enhancement in energy density.

The carbonaceous matrix may be based upon graphene which is a very low density/high surface area form of carbon. The carbonaceous matrix may be provided for the disclosed use as a graphene aerogel or the like low density carbon based matrix exhibiting a large surface area and serving as a scaffold for supporting pseudocapacitive materials. Various forms of high surface area carbon are commercially available and include any of activated carbon, carbon fibres, or graphite, carbon nanotubes, carbon aerogel or a carbon fabric or cloth or tape, for example rayon or viscose. The carbonaceous matrix may be porous, microporous or nanoporous, whereby an ionic liquid or electrolyte may be adsorbed or penetrate into the carbonaceous matrix.

A suitable graphene matrix may be obtained by treating graphite powder according to the so-called "Hummers method" (William S. Hummers Jr., Richard E. Offeman, *J. Am. Chem. Soc.*, 1958, 80 (6), pp 1339-1339, DOI: 10.1021/ja01539a017, Publication Date: March 1958) to obtain a graphitic oxide (graphene oxide) which can be dispersed in water and subjected to a hydrothermal reaction in order to obtain the reduced form which after freeze-drying rearranges in 3D to a high surface area form of graphene.

Alternative methods to obtain graphene oxide may one of the methods known in the art as "Brodie method", "Staudenmaier method", "Hofmann method" and "Tour method".

In order to introduce the desired modification or doping with pseudocapacitive materials to the carbonaceous matrix, a graphene matrix as obtainable by the Hummers method, a precursor for the intended transition metal chalcogenide/transition metal oxide may be introduced to the graphene oxide, or to the graphene oxide dispersion in water, before the hydrothermal treatment. For example, phosphomolybdic acid and L-cysteine may be used for the co-synthesis of $MoS_2$ nanoflakes.

In alternative embodiments the introduction of the pseudocapacitive materials to the carbonaceous matrix may be achieved by other wet or dry technologies such as for example electrodeposition, chemical vapor deposition, sputtering, atomic layer deposition and others.

The device disclosed herein may comprise electrolytes comprising one or more salts selected from organic salts, and inorganic salts in a liquid medium selected from high boiling temperature solvents and ionic liquids. The device disclosed herein notably uses non-aqueous electrolyte compositions and preferred embodiments of the device are designed to exclude in so far as is possible harmful moisture or damaging water ingress.

Embodiments may employ electrolyte compositions in the form of liquids, polymers or gels.

A polymer gel type would include a polymeric matrix; optionally a plasticizer or viscosity modifier or aprotic solvent; and an ionic salt as electrolyte. Such forms a suitable coating composition for plating or covering a current collector or electrode.

Various polymers have been proposed for gel electrolyte use, including polyacrylonitrile "PAN", Polyoxyethylene "PEO", polymethylmethacrylate "PMMA", polyvinylidene fluoride "PVDF" and poly(vinylidene fluoride-co-hexafluoropropylene) (PVDF-HFP).

Solvents and co-solvents serving as liquid vehicles for the polymer preparation may include, for example, acetone, tetrahydrofuran "THF", dimethylacetamide "DMAc", dimethylformamide "DMF", N-methyl-2-pyrrolidone "NMP", and other aprotic organic solvents.

In embodiments, for example, a gel-polymer type of electrolyte can be obtained by mixing a solution of polymer, such as poly(vinylidenefluoride-hexafluoropropylene) "PVDF-HFP" (dissolved in a solvent,) with an ionic liquid, as described in [Lu, Wen, et al. "Incorporating ionic liquid electrolytes into polymer gels for solid-state ultracapacitors." Journal of the Electrochemical Society 155.5 (2008): A361-A367.]. In this way it is possible to increase the mechanical stability of the device avoiding the use of a separator. The polymer electrolyte can act at the same time as ions conductor and separator to avoid short-circuit under bending of the electrodes, strongly simplifying the fabrication process of the device. The electrolyte, optionally realised as a gel-like material, may contain a dielectric particulate material, optionally a ceramic or a ceramic composite, for example nanoparticles of an inorganic material such as alumina, titania, magnesium silicate etc. or clays for example such as any one of bentonite, montmorillonite, kaolinite, tonstein, laponite clay, conveniently a bentonite, or combinations of any of these dielectric particulate materials. Electrolytes which are useful in the present device comprise non-aqueous solvents, cations and anions, which may be organic or inorganic salts optionally mixed with ionic liquids. The following table shows solvents which are considered as suitable candidates for use in the electrolyte composition for use in a device disclosed herein especially for high temperature applications because these solvents do not undergo a change to a gaseous state at normal (sea level) atmospheric pressure until a temperature of at least 150° C. is reached.

from composites of a carbonaceous matrix modified or doped with transition metal dichalcogenides to form an electrical device is highly innovative especially for high temperature applications of capacitive electrical energy storage devices.

In embodiments the electrical energy storage device, especially a "supercapacitor" comprises a metallic current collector having at least one surface covered with a carbonaceous matrix modified or doped with pseudocapacitive materials, such as a transition metal dichalcogenide nanostructure, for example based on $MoS_2$.

In a method the carbonaceous matrix is based on graphene which can be obtained by treating a graphite powder that can be oxidized, expanded and exfoliated following the so-called Hummer method or any of the equivalent methods for obtaining graphene oxide as mentioned above. The resulting graphene oxide (GO) powder can be easily dispersed in water and this solution can be used for a hydrothermal reaction in order to obtain at the same time the reduction of the GO (reduced graphene oxide—rGO) and a 3D arrangement with high surface area (after freeze drying)—so-called "aerogel".

| Solvent | Melting point/° C. | Flash point/° C. | Boiling point/° C. | Density/ g/mL | Solubility in water/g/100 g |
|---|---|---|---|---|---|
| Glycerin | 17.8 | 160 | 290 | 1.26 | Misciblle |
| diethylene glycol | −10 | 124 | 246 | 11.2 | 10 |
| Propylene carbonate | −49 | | 242 | 1.2 | miscible |
| Hexamethylphosphoramide (HMPA) | 7.2 | 105 | 232.5 | 1.03 | misciblle |
| N-methyl-2-pyrrolldinone (NMP) | −24 | 91 | 202 | 1.033 | 10 |
| ethylene glycol | −13 | 111 | 195 | 1.115 | miscible |
| dimethyl sulfoxide (DMSO) | 18.4 | 95 | 189 | 1.092 | 25.3 |
| digiyme (diethylene glycol dimethylether) | −68 | 67 | 162 | 0.943 | miscible |
| dimethyl-formamide (DMF) | −60.5 | 58 | 153 | 0.9445 | miscible |
| Hexamethylphosphorous triamide (HMPT) | −44 | 26 | 150 | 0.898 | miscible |

These solvents may be used as diluents for the electrolyte compositions disclosed herein.

Cations may be obtained by including at least one quaternary ammonium salt in a non-aqueous electrolyte composition. Suitable cations may be selected without limitation from list (i) below:
  (i) tetrabutylammonium, 1-ethyl 3-methylimidazolium, 1-butyl-3-methylimidazolium, 1-(3-cyanopropyl)-3-methylimidazolium, 1,2-dimethyl-3-propylimidazolium, 1,3-bis(3-cyanopropyl)imidazolium, 1,3-diethoxyimidazolium, 1-butyl-1-methylpiperidinium, 1-butyl-2,3-dimethylimidazolium, 1-butyl-4-methylpyridinium, 1-butylpyridinium, 1-decyl-3-methylimidazolium, 3-methyl-1-propylpyridinium" used alone or in a combination of two or more thereof.

Anions may be obtained by including at least one salt in a non-aqueous electrolyte composition. Suitable anions may be selected without limitation from list (ii) below:
  (ii) ethylsulfate, methylsulfate, thiocyanate, acetate, chloride, methanesulfonate, tetrachloraluminate, tetrafluoroborate, hexafluorophosphate, trifluoromethanesulfonate, bis (pentafluoroethanesulfonate)imide, trifluoro(trifluoromethyl)borate bis(trifluoromethanesulfonate)imide, tris(trifluoromethane 3 sulfonate)methide, dicyanamide" used alone or in a combination of two or more thereof.

The proposed electrolyte composition based on non-aqueous materials including inorganic salts in organic electrolytes is novel and the use thereof with electrodes formed In order to modify or dope the 3D rGO aerogel with a metal-sulfide (MSx) or metal-oxides ($MO_x$), wherein x corresponds to the available valency of the metal M, it is sufficient to simply add a suitable precursor into the GO dispersion before the hydrothermal synthesis (for example using phosphomolybdic acid and L-cysteine for the co-synthesis of $MoS_2$ nanoflakes).

The materials obtained can be mixed with a binder (usually a polymer, such as PVDF, PTFE, Polythiophene, Poly(2,3-dihydrothieno-1,4-dioxin)-poly(styrenesulfonate) i.e. PEDOT:PSS or any other polymer able to sustain temperature up to 200° C. without detrimental degradation) dissolved in a suitable solvent obtaining a slurry, a paste with a viscosity suitable for deposition by screen printing or drop-casting onto a current collector (can be metallic or carbon-based) in shape of wire, foil, mesh, foam or sponge for example.

Alternative binders to produce the slurry can be aqueous-based processing binders such as Styrene Butadiene Copolymer (SBR), xanthan gum, polyacrylic acid (PAA) and modified with Na-(NaPAA), Na-Alginate, Poly Amine Imide (PAI), Fluorine Acrylic Latex Binder, and cellulose-based binders (carboxy methyl cellulose (CMC) and modified with Li salt (Li-CMC), sodium salt (Na-CMC), polyurethane (PU/CMC), polyacrylic acid (PAA/CMC), poly (acrylic acid sodium) (NaPAA-g-CMC copolymer), microfibrillated cellulose (MFC) and modified with polypyrrole (MFC/PPy))

If a planar configuration is selected, the slurry can be deposited on both sides of the current collector in order to increase the available surface area and consequently the capacitance of the device.

Polyimide tape (or any other polymer able to sustain temperature up to 200° C. without detrimental degradation—considering also the materials used as separators) can be used as adhesive layer on which the current collector can be attached in order to facilitate a subsequent device configuration shaping procedure.

After thermal evaporation of the solvent, electrodes can be assembled in parallel configuration with a separator sandwiched between them. The separator can be a porous polymer with suitable thermal stability properties (such as PTFE, PVDF, Polyimide, etc.) or made from glass wool or fibers or ceramics.

The current collectors can be cut with a rectangular shape with a projection on the collector to be used as electrical contact, or can be cut in any other shapes.

The resulting multilayer can be rolled as a winding (scrolled) into a cylindrical shape, or maintained as a planar architecture and fixed with additional polyimide tape. The scrolled device can be filled with the electrolyte by immersing it into an electrolyte solution and vacuum-treated such that the whole system is held in a low pressure (vacuum) environment, allowing separator infiltration and air evacuation. Alternatively, the multilayer can be assembled into a "coin" cell, a "coffee bag" (pouch) cell or any other architectures.

After electrolyte filling, the device can be coated with a layer of photo-curable resin, preferably of UV-curable resin and UV irradiated to completely polymerize the resin, sealing the device. This step can be repeated several times in order to improve the sealing and obtaining a continuous and uniform polymeric film.

When assembling devices due consideration should be given to selection of secondary components such as O-rings, or seals for the selected architecture of the device for a high temperature application, avoiding for example a standard polypropylene material, and substituting one of high temperature operational characteristics such as a custom-made O-ring of polytetrafluoroethylene (PTFE), or perfluoroalkoxy copolymer (PFA), or ethylene tetrafluoroethylene (ETFE) or fluorinated ethylene propylene (FEP), or encapsulation of an O-ring using such fluorocarbon polymers, or using where appropriate a seal of a flexible high temperature operating range graphite material such as GRAFOIL®.

BRIEF DESCRIPTION OF THE DRAWINGS

The accompanying drawings, which will be referred to hereinafter for the purpose of further illustrating the disclosure by way of example, include.

DETAILED DESCRIPTION

Figure 1:
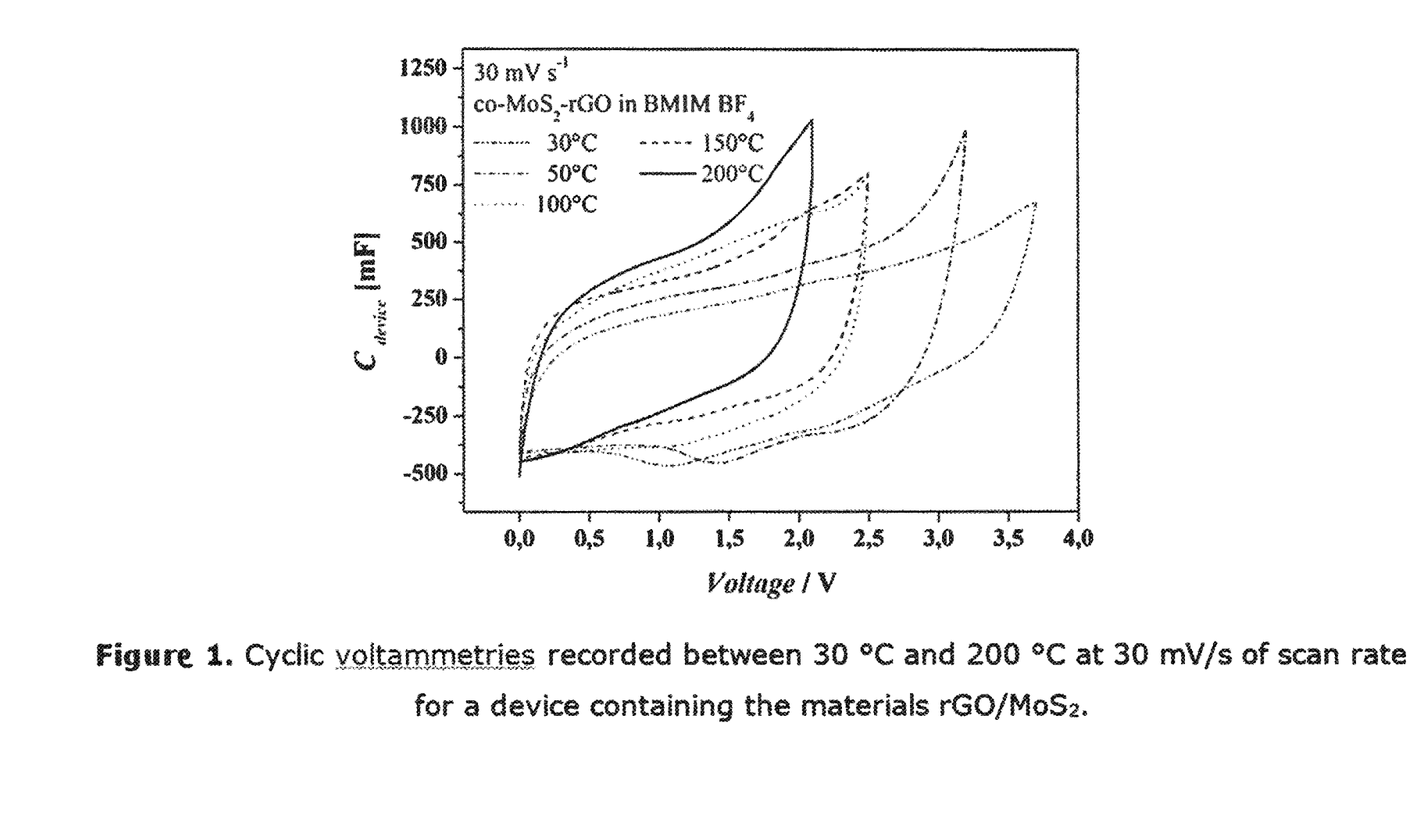
FIG. 1 shows a graphical representation of cyclic voltammetries recorded between 30° C. and 200° C. at 30 mV/s of scan rate for a device containing the materials reduced graphene oxide doped with $MoS_2$.
Figure 2:
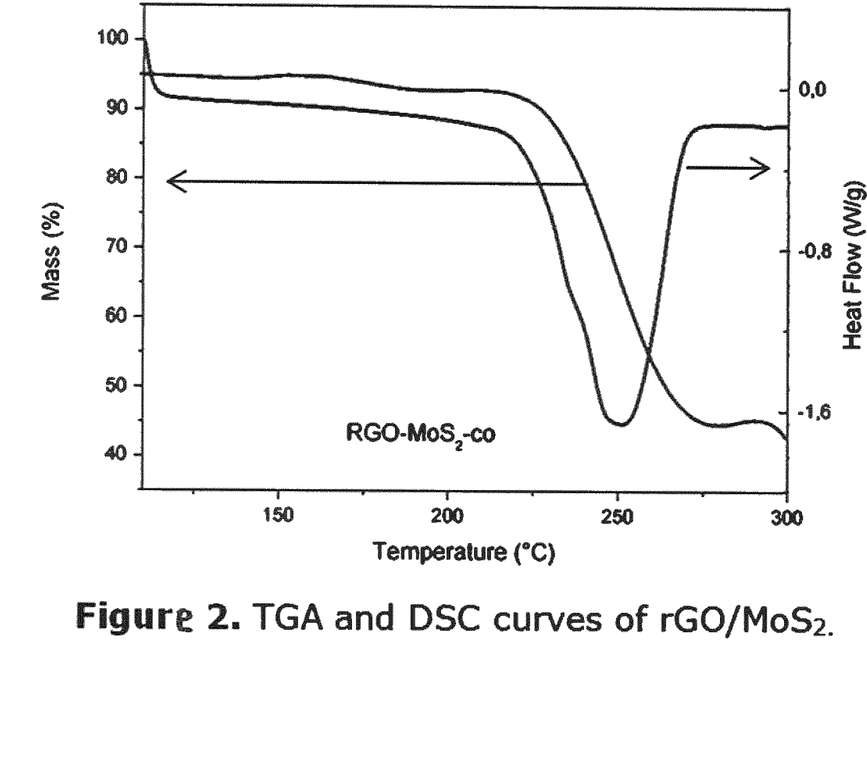
FIG. 2 shows a graphical representation of a thermal analysis (TGA and DSC) to assess the optimal thermal stability of the disclosed graphene oxide doped with $MoS_2$ up to 220° C.

Referring to the accompanying FIG. 1, a comparison of materials discussed in Shen, Baoshou, et al. Journal of Materials Chemistry A 4.21 (2016): 8316-8327, and Borges, Raquel S., et al. Scientific reports 3 (2013), with an embodiment made in accordance with this disclosure, reveals that the embodiment disclosed here, exhibits capacitance values up to 210 F/g (corresponding to 365 $mF/cm^2$) @ 200° C. with a voltage windows equal to 2.1 V. These values are superior in terms of specific capacitance (both in gravimetric and areal density). The specific capacitance values recorded at the different temperatures are collected in Table 1 below.

TABLE 1

| Capacitance values recorded at the different temperatures | | |
| --- | --- | --- |
| Temp (° C.) | $C_s$ (F/g) | $C_s$ (mF/cm$^2$) |
| 30 | 174.9 | 306.2 |
| 50 | 202.1 | 353.7 |
| 100 | 209.3 | 366.1 |
| 150 | 190.8 | 333.9 |
| 200 | 208.5 | 364.6 |

Figure 3:
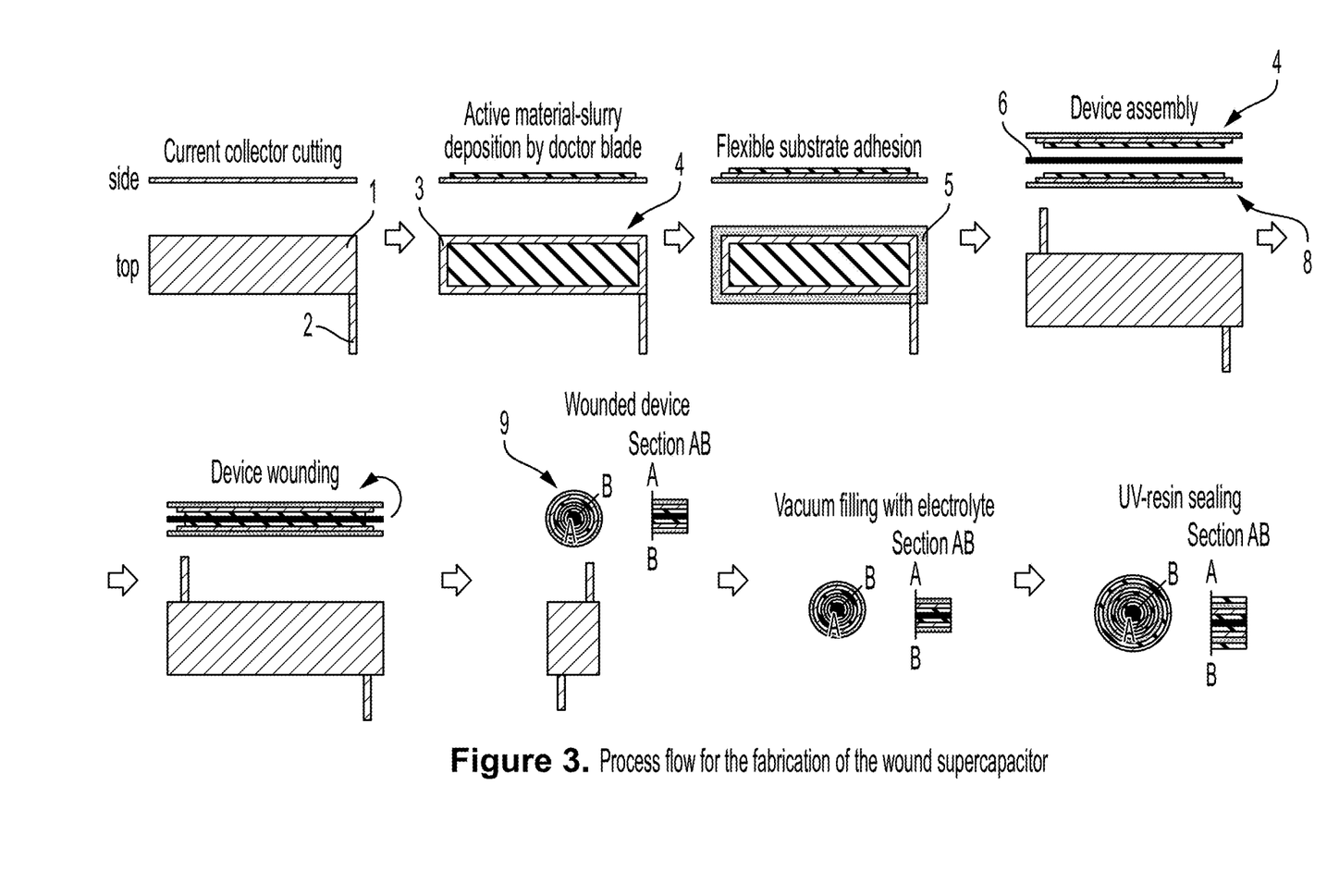
FIG. 3 illustrates schematically an assembly of a supercapacitor device.

A device may be assembled according to the following illustrative procedure, representing one possible embodiment of one possible assembly method without limitation, and referring to FIG. 3, wherein in a first stage, a metallic current collector element 1 is formed by cutting or stamping from sheet metal to a desired shape, optionally with a projecting electrical conducting connector 2. An active material in the form of a slurry, gel, or paste as described hereinbefore, and comprising a carbonaceous matrix modified or doped with pseudo-capacitive materials together with a polymeric binder can be applied to the current collector element 1 in a controlled manner, for example using a doctor blade, to form a deposit 3 covering a selected surface area on at least one surface of the current collector element 1 to provide a first electrode 4. The electrode can be mounted upon a flexible support substrate 5. The same procedure is repeatable to provide a second electrode 8. The electrodes 4, 8 may be thermally processed under reduced pressure to remove solvent sufficiently and minimise moisture presence before any subsequent assembly steps. The electrodes 3, 8 are oriented and juxtaposed in a confronting spaced relationship and a porous polymeric sheet separator 6 of appropriate thermal stability is introduced between the electrodes 4, 8 to form a laminar assembly.

Optionally the laminar assembly may be scrolled into a generally cylindrical body 9. The scrolled cylindrical body 9 can be introduced to an electrolyte solution, for example by immersion in a bath of electrolyte, and subjected to a reduced pressure to facilitate separator 6 infiltration with the electrolyte solution and air evacuation. After electrolyte filling, the cylindrical body 9 can be coated with a layer of photo-curable resin and UV-irradiated to sufficiently polymerize the resin, thereby providing a sealed device. The resin coating step may be repeated and other finishing steps may be optionally carried out to provide a sealed device with a continuous and uniform polymeric film surface.

Advantages of the disclosed methods, materials and device include the ability to realise a device that is capable of operating at the working temperature required for subterranean, for example a downhole application (up to 200° C. or above) exploiting electrolytes at lower viscosity and higher ionic mobility with respect to the known products, combined with composite electrodes (for example a 3D graphene network including pseudocapacitive materials) able to deliver capacitance values which are higher than the values attainable by the exploitation of carbon allotropes alone.

What is claimed is:

1. A device comprising:
    current collector elements, wherein each current collector element comprises metallic components having at least one surface covered with a composite material;
    wherein the composite material comprises a carbonaceous matrix and a polymeric binder able to sustain temperatures up to 200° C. without detrimental degradation;
    wherein the carbonaceous matrix is based on graphene and is doped with transition metal dichalcoqenides that comprise one or more transition metal compounds; and
    wherein the carbonaceous matrix is a 3D-multilayer structure that is formed by introducing precursors of the dichalcoqenides into graphene oxide to be dispersed in water or into a graphene oxide dispersion in water and then subjecting the dispersion to a hydrothermal treatment;
    wherein the device is filled with a non-aqueous electrolyte composition so that the carbonaceous matrix is in contact with the non-aqueous electrolyte composition that comprises cations and anions in a liquid medium selected from high boiling temperature solvents and ionic liquids; and
    wherein the solvents do not undergo a change to a gaseous state at normal atmospheric pressure and at a temperature of at least 150° C.

2. The device of claim 1, wherein the non-aqueous electrolyte composition comprises one or more salts selected from the group consisting of organic salts and inorganic salts.

3. The device of claim 1, wherein the non-aqueous electrolyte composition comprises at least one quaternary ammonium salt.

4. The device of claim 1, wherein the non-aqueous electrolyte composition comprises at least one cation selected from the group consisting of tetrabutylammonium, 1-ethyl 3-methylimidazolium, 1-butyl-3 methylimidazolium, 1-(3-cyanopropyl)-3-methylimidazolium, 1,2-dimethyl-3-propylimidazolium, 1,3-bis(3-cyanopropyl)imidazolium, 1,3-diethoxyimidazolium, 1-butyl-1-methylpiperidinium, 1-butyl-2,3-dimethylimidazolium, 1-butyl-4-methylpyridinium, 1-butylpyridinium, 1-decyl-3-methylimidazolium, and 3-methyl-1-propylpyridinium.

5. The device of claim 1, wherein the non-aqueous electrolyte composition comprises at least one anion selected from the group consisting of ethylsulfate, methylsulfate, thiocyanate, acetate, chloride, methanesulfonate, tetrachloraluminate, tetrafluoroborate, hexafluorophosphate, trifluoromethanesulfonate, bis (pentafluoroethanesulfonate) imide, trifluoro(trifluoromethyl)borate, bis(trifluoromethanesulfonate)imide, tris(trifluoromethane 3 sulfonate)methide, and dicyanamide.

6. The device of claim 1, wherein the non-aqueous electrolyte composition comprises at least one of the following: glycerin, ethylene glycol, diethylene glycol, diethylene glycol dimethyl ether (diglyme), propylene carbonate, hexamethylphosphoramide (HMPA), N-methyl-2-pyrrolidinone (NMP), dimethyl sulfoxide (DMSO), dimethyl formamide (DMF), and hexamethylphosphorous triamide (HMPT).

7. The device of claim 1, wherein the carbonaceous matrix is modified or doped with pseudo-capacitive materials by a method selected from the group consisting of electrodeposition, chemical vapour deposition (CVD), sputtering, and atomic layer deposition.

8. The device of claim 1, wherein the carbonaceous matrix is modified or doped with a metal chalcogenide.

9. The device of claim 8, wherein the carbonaceous matrix is modified or doped with a metal oxide.

10. The device of claim 1, wherein the transition metal dichalcogenides further comprise at least one component material selected from the group consisting of $MoS_2$, $MoSe_2$, $WS_2$, $WSe_2$, $TeS_2$, $TeSe_2$, $TiS_2$, $TaS_2$, $ZrS_2$, $MoSe_2$, $TaSe_2$, $NbSe_2$, $MoTe_2$, $NiTe_2$, $BiTe_2$, $GeS_2$, $GeSe_2$, $GeTe Zn_2$, $FeS_2$, $FeSe_2$, $SnS_2$, $CoS_2$, $VS_2$, and combinations thereof.

11. The device of claim 1, wherein the current collector elements comprise metallic components, supported upon plastics or ceramics, and configured as one form selected from the group consisting of a mesh, a foil, a foam, a sponge, a sheet, a scroll, a plate, a coil, and a rod.

12. The device of claim 1, wherein the carbonaceous matrix comprises a graphene aerogel, and the transition metal dichalcogenides comprise molybdenum disulphide.

13. The device of claim 1 configured as a supercapacitor and comprising a plurality of current collector elements serving as positive electrodes and negative electrodes, with electrical conductor elements for connecting the plurality of current collector elements to an external electrical circuit, the plurality of current collector elements each being in contact with the non-aqueous electrolyte composition confined within the device, and having a separator positioned between the current collector elements so that the positive, and negative electrodes are separated.

14. The device of claim 13, wherein the separator comprises a thermally stable polymer, or a ceramic, or a glass, and the separator is porous.

15. The device of claim 13, wherein the device is configured as a multilayer structure, filled with electrolyte and sealed with a polymer or resin that may be assembled into a coin cell or a pouch cell.

16. The device of claim 15, wherein the device is sealed using a photocurable resin.

17. A device comprising:
    current collector elements, wherein each current collector element comprises metallic components having at least one surface covered with a composite material;
    wherein the composite material comprises a carbonaceous matrix and a polymeric binder able to sustain temperatures up to 200° C. without detrimental degradation;
    wherein the carbonaceous matrix is based on graphene and is doped with transition metal dichalcogenides that comprise one or more transition metal compounds; and
    wherein the carbonaceous matrix is a 3D-multilayer structure that is formed by introducing precursors of the dichalcogenides into graphene oxide to be dispersed in water or into a graphene oxide dispersion in water and then subjecting the dispersion to a hydrothermal treatment;
    wherein the carbonaceous matrix is in contact with a non-aqueous electrolyte composition that comprises cations and anions in a liquid medium selected from high boiling temperature solvents and ionic liquids; and
    wherein the solvents do not undergo a change to a gaseous state at normal atmospheric pressure and at a temperature of at least 150° C.

18. An electric energy storage device comprising:
    current collector elements, wherein each current collector element comprises a metallic base having at least one surface covered with an active material, the active material having a graphene matrix and a polymeric binder that is a non-aqueous- processing based binder and is able to sustain temperature up to 200° C. without degradation, wherein the graphene matrix is modified or doped with transition metal dichalcogenides, which comprise one or more transition metal compounds;

wherein the graphene matrix is a 3D-multilayer structure that is formed by introducing precursors of the dichalcogenides into graphene oxide to be dispersed in water or into a graphene oxide dispersion in water and then subjecting the dispersion to a hydrothermal treatment;

wherein the device is filled with a non-aqueous electrolyte composition so that the graphene matrix is in contact with the non-aqueous electrolyte composition; wherein the non-aqueous electrolyte composition comprises cations and anions in a liquid medium comprising high boiling temperature solvents and ionic liquids; and wherein the high boiling solvents that are selected do not undergo a change to a gaseous state at normal atmospheric pressure and at a temperature of at least 150° C.

19. The device of claim 18, wherein the non-aqueous electrolyte composition comprises one or more salts selected from organic salts and inorganic salts.

20. The device of claim 18, wherein the non-aqueous electrolyte composition comprises at least one quaternary ammonium salt.

21. The device of claim 18, wherein the non-aqueous electrolyte composition comprises at least one cation selected from the group consisting of: tetrabutylammonium, 1-ethyl 3-methylimidazolium, 1-butyl-3 methylimidazolium, 1-(3-cyanopropyl)-3-methylimidazolium, 1,2-dimethyl-3-propylimidazolium, 1,3-bis(3-cyanopropyl)imidazolium, 1,3-diethoxyimidazolium, 1-butyl-1-methylpiperidinium, 1-butyl-2,3-dimethylimidazolium, 1-butyl-4-methylpyridinium, 1-butylpyridinium, 1-decyl-3-methylimidazolium, and 3-methyl-1-propylpyridinium.

22. The device of claim 18, wherein the non-aqueous electrolyte composition comprises at least one anion selected from the group consisting of: ethylsulfate, methylsulfate, thiocyanate, acetate, chloride, methanesulfonate, tetrachloraluminate, tetrafluoroborate, hexafluorophosphate, trifluoromethanesulfonate, bis (pentafluoroethanesulfonate) imide, trifluoro(trifluoromethyl)borate, bis(trifluoromethanesulfonate)imide, tris(trifluoromethane 3 sulfonate)methide, and dicyanamide.

23. The device of claim 18, wherein the non-aqueous electrolyte composition comprises at least one material selected from the group consisting of: glycerin, ethylene glycol, diethylene glycol, diethylene glycol dimethyl ether (diglyme), propylene carbonate, hexamethylphosphoramide (HMPA), N-methyl-2-pyrrolidinone (NMP), dimethyl sulfoxide (DMSO), dimethyl formamide (DMF), and hexamethylphosphorous triamide (HMPT).

24. The device of claim 18, wherein the graphene matrix is modified or doped by a method selected from the group consisting of:

electrodeposition, chemical vapour deposition (CVD), sputtering, and atomic layer deposition.

25. The device of claim 18, wherein the transition metal dichalcogenide is selected from the group consisting of: $MoS_2$, $MoSe_2$, $WS_2$, $WSe_2$, $TeS_2$, $TeSe_2$, $TiS_2$, $TaS_2$, $ZrS_2$, $MoSe_2$, $TaSe_2$, $NbSe_2$, $MoTe_2$, $NiTe_2$, $BiTe_2$, $GeS_2$, $GeSe_2$, $GeTeZn_2$, $FeS_2$, $FeSe_2$, $SnS_2$, $CoS_2$, $VS_2$, and any combination thereof.

26. The device of claim 18, wherein the current collector elements comprise a metallic base supported upon plastics or ceramics and configured as one structure selected from the group consisting of a mesh, a foil, a foam, a sponge, a sheet, a scroll, a plate, a coil, and a rod.

27. The device of claim 18, wherein the graphene matrix comprises a graphene aerogel, and the transition metal dichalcogenides comprise molybdenum disulphide.

28. The device of claim 18, wherein the device is configured as a supercapacitor, and wherein the supercapacitor comprises a plurality of current collector elements serving as positive and negative electrodes, with electrical conductor elements configured to connect the current collector elements to an external electrical circuit, the plurality of current collector elements each being in contact with a non-aqueous electrolyte composition confined within the device, and having a separator positioned between the current collector elements so that positive, and negative electrodes are separated.

29. The device of claim 28, wherein the separator is porous and comprises a thermally stable polymer, or a ceramic, or a glass.

30. The device of claim 28, wherein the device is configured as a multilayer structure, filled with electrolyte and sealed with a polymer or resin that can be assembled into a coin cell or a pouch cell.

31. The device of claim 30, wherein the device is sealed using a photo-curable resin.

* * * * *